United States Patent
Berger

(10) Patent No.: US 9,096,958 B2
(45) Date of Patent: Aug. 4, 2015

(54) INFLATABLE WOVEN TUBULAR BELT

(76) Inventors: Johann Berger, Schwäbisch Gmünd (DE); Franz Paule, legal representative, Schwäbisch Gmünd (DE)

( * ) Notice: Subject to any disclaimer, the term of this patent is extended or adjusted under 35 U.S.C. 154(b) by 200 days.

(21) Appl. No.: 13/703,780

(22) PCT Filed: Jun. 16, 2011

(86) PCT No.: PCT/EP2011/003150
§ 371 (c)(1),
(2), (4) Date: Apr. 9, 2014

(87) PCT Pub. No.: WO2011/157455
PCT Pub. Date: Dec. 22, 2011

(65) Prior Publication Data
US 2014/0230951 A1    Aug. 21, 2014

(30) Foreign Application Priority Data
Jun. 15, 2010  (DE) .......................... 10 2010 023 825

(51) Int. Cl.
| | |
|---|---|
| *D03D 3/02* | (2006.01) |
| *D03D 1/00* | (2006.01) |
| *B60R 22/12* | (2006.01) |
| *D03D 13/00* | (2006.01) |
| *D03D 1/02* | (2006.01) |
| *B60R 21/18* | (2006.01) |

(52) U.S. Cl.
CPC .............. *D03D 1/0005* (2013.01); *B60R 22/12* (2013.01); *D03D 13/008* (2013.01); *B60R 21/18* (2013.01)

(58) Field of Classification Search
CPC ..... D03D 1/0005; D03D 11/00; D03D 11/02; D03D 15/00; D03D 2700/0118; D03D 5/00
USPC ........................ 139/384 R, 383 R, 420 A, 432
See application file for complete search history.

(56) References Cited

U.S. PATENT DOCUMENTS

| | | | | |
|---|---|---|---|---|
| 4,018,960 A | * | 4/1977 | Berger et al. | .................. 428/193 |
| 4,148,957 A | * | 4/1979 | Berger et al. | .................. 428/193 |
| 4,174,738 A | * | 11/1979 | Berger et al. | .............. 139/384 R |
| 4,600,626 A | * | 7/1986 | Ogata | ........................... 428/193 |
| 6,705,244 B1 | | 3/2004 | Berger et al. | |

FOREIGN PATENT DOCUMENTS

| | | |
|---|---|---|
| CA | 2319832 A1 | 8/1999 |
| DE | 19932940 A1 | 1/2001 |

* cited by examiner

*Primary Examiner* — Bobby Muromoto, Jr.
(74) *Attorney, Agent, or Firm* — Harness, Dickey & Pierce, P.L.C.

(57) ABSTRACT

A seat belt is woven, tubular and inflatable, and includes warp threads in an upper woven layer and warp threads in a lower woven layer, wherein the number of the warp threads in the upper woven layer is approximately 1.5 times to three times the number of the warp threads in the lower woven layer.

7 Claims, 1 Drawing Sheet

INFLATABLE WOVEN TUBULAR BELT

CROSS-REFERENCE TO RELATED APPLICATIONS

This application is a National Phase Entry of International Application No. PCT/EP2011/003150, filed on Jun. 16, 2011, which is incorporated by reference herein.

BACKGROUND AND SUMMARY

The present invention relates to an inflatable woven tubular belt.

Known from EP 1 056 894 B1 is an inflatable belt which is installed in a motor vehicle serving as a passenger air bag in case of a collision. DE 199 32 940 A1 shows a two-layer belt, particularly for a vehicular seat belt inflatable at least in part, the belt being formed as a flat tubular belt featuring a lower (first) layer (UWL) and an upper (second) layer (OL) wherein the lower layer (UWL) is woven and incorporating non-elastic warp threads (UK) and the upper layer (OL) is made in a material which is elastic lengthwise in the belt.

Further seat belt systems involving an air bag engineered as a tubular belt are known featuring two belt layers with a folded air bag woven fabric in-between. It is, of course, natural that such an engineered solution is more bulky as compared to a conventional "two-dimensional" seat belt, even when the belt is engineered with a low profile. Problems tend to occur with such belts particularly when negotiating deflector fittings for which a satisfactory solution is still wanted. When the belt is negotiating a deflector fitting or being rolled up on the retractor a movement occurs of the portion of the seat belt located far from the deflection or rolling axis relative to the portion of the belt nearer to the rolling or retraction axis resulting in trapping which produces creases to the detriment of the belt and adding to the discomfort of wearing the belt.

The solution as proposed in German Patent DE 199 32 940 A1 has also turned out to be non-optimal, it having been discovered that although the elastic warp threads in a layer are capable of compensating distortion when the belt is negotiating the fittings and when being retracted, the warp threads of both layers, i.e. the upper and lower layer need to be engineered for a minimum ultimate load to be fully functionable. In this case it is known that elastic warp threads have no appreciable ultimate load capacity.

This is why the object of the invention is to propose a belt which now avoids or at least diminishes the drawbacks known in prior art particularly as regards the distortion involved in negotiating the fittings and during retraction. This object is achieved by a belt in accordance with the invention, so that the number of first warp threads in the upper woven layer is approx. 1.5 times to three times greater than the number of first warp threads in the lower woven layer it is now achieved to advantage that the belt exhibits an optimum response on being rolled in and out of the retractor. Its response to negotiating the fittings is now also satisfactory. Thanks to the engineering in accordance with the invention the corrugations and "banana" curvatures in the belt as known in prior art after just short usage of the belt are now avoided. It has surprisingly been discovered that the woven layer having fewer warp threads than the other woven layer now tends to "guide" the other woven layer when negotiating a fitting, it adjusting to the contour of the other woven layer having more warp threads.

This object is also achieved by a belt in accordance with the invention, in this case so that the yarn count of first warp threads in the upper woven layer is approx. 1.5 times to three times greater than the yarn count of first warp threads in the lower woven layer it is now achieved to advantage that the belt exhibits the same response as previously set forth. In this description it is understood that the first warp threads and second warp threads differ by the first warp threads handling the tension in the belt in accordance with the invention when functioning as a seat belt, whilst the second warp threads—together with the weft threads—represent the tube-forming components which substantially handle no tensile force lengthwise in the tubular belt.

BRIEF DESCRIPTION OF THE DRAWINGS

For a better understanding of the invention it will now be detailed by description of its aspects with reference to the drawing in which.

DETAILED DESCRIPTION

Figure 1:
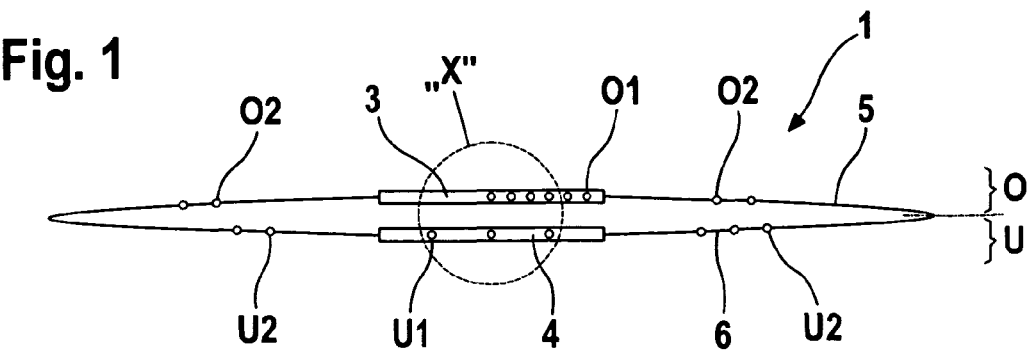
FIG. 1 is a diagrammatic section view through a belt in accordance with the invention.
Figure 1A:
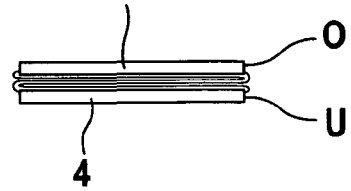
FIG. 1a is a diagrammatic view in the belt in accordance with the invention as shown in FIG. 1, with warp thread portions folded between the middle warp thread portions of the belt.

Referring now to FIG. 1 there is illustrated a belt 1 in a greatly simplified diagrammatic section view in the position in which it leaves the weaving machine, showing—as viewed in the longitudinal direction of the tubular belt 1—an upper woven layer O and a lower woven layer U of the two-layer belt 1, with warp thread portions 3, 4 as well as 5 and 6 indicated symbolically as lines. The upper woven layer O and lower woven layer U depicted somewhat exploded for a better overview feature first warp threads O1 and U1: the upper layer being woven with first warp threads O1 and the lower layer with first warp threads U1. The warp threads O1 and U1 are incorporated in the ratio 1.5 to 3 to one for O1 to U1 in the belt. Second warp threads O2 and U2 having no substantial function in handling ultimate loading lengthwise of the belt 1 are woven in the upper layer and lower layer as parts of the air bag woven tubular, representing the tubular belt 1. When the belt in accordance with the invention is in use it is to be imagined that the portions woven with the second warp threads are sandwiched between the middle warp thread portions (see FIG. 1a) so that to outward appearances just the parts 3 and 4 woven with the upper and lower first warp threads O1 and U1 are evident.

Figure 2:
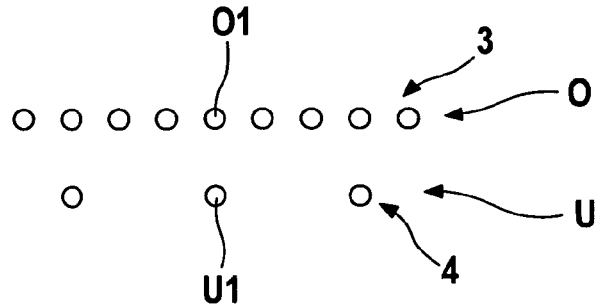
FIG. 2 is a detail in a belt in accordance with the invention as shown in FIG. 1 in a diagrammatic section view as a first example embodiment.

Referring now to FIG. 2 there is illustrated the detail "X" from FIG. 1 showing just the first warp threads O1 in the upper woven layer O and the first warp threads U1 in the lower woven layer U. For a better overview all weft threads belonging to the belt 1 in accordance with the invention—oriented in sense parallel to the plane of the drawing—have been omitted. As an example FIG. 2 is intended to show that the upper woven layer O contains three times as many first warp threads O1 as the lower woven layer U contains first warp threads U1.

Figure 3:
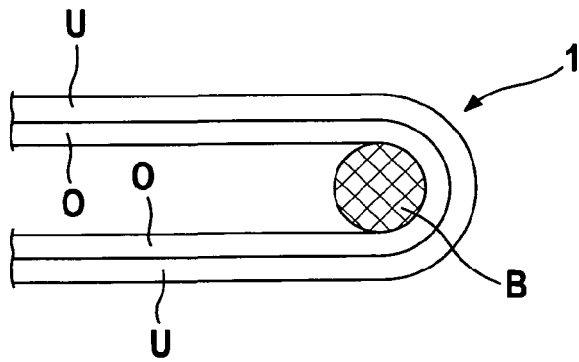
FIG. 3 is a diagrammatic view showing the belt in accordance with the invention negotiating a deflector fitting.

Referring now to FIG. 3 there is illustrated a more or less round fitting B negotiated by the belt 1 being deflected through approx. 180°, showing how the upper woven layer O is in contact with the fitting B whilst the lower woven layer U likewise negotiates the fitting B but spaced away by the "thickness" of the fitting B in being somewhat stretched as compared to the upper woven layer O. This stretching can be imagined multiplied when instead of just negotiating the fitting B the belt now negotiates the winding spindle in a retractor.

When the belt is pulled out from the retractor it is required to rest straight and flat on the body of the passenger in the vehicle as is now achievable to advantage with the belt 1 in accordance with the invention due to the fact that the number of first warp threads O1 in the upper woven layer O is approx. 1.5 to 3 times as great as the number of first warp threads U1 in the lower woven layer U in guiding the lower woven layer U so-to-speak whilst compensating the stretch of the first warp threads U1 in the lower woven layer U. It was surprisingly discovered that the belt 1 in accordance with the invention can now be extended without any corrugated effect because of how the belt is now engineered in accordance with the invention, i.e. arranging for the number of the first warp threads O1 and U1 to be in the ratio 1.5 to 3 to 1 (O1 to U1). Again as surprisingly discovered, the belt 1 in accordance with the invention likewise does not become corrugated when in accordance with the second solution as claimed in claim 2 the yarn count of the first warp threads O1' in the upper woven layer O is approx. 1.5 to 3 times as large as the yarn count of the first warp threads U1' in the lower woven layer U, as shown in FIG. 4 diagrammatically.

Engineering the belt in accordance with the invention in the following ratio relationships can be of advantage:
a) (e. g. FIG. 2)

$$\frac{\text{No. of first warp threads } O1 \text{ in upper woven layer } O}{\text{No. of first warp threads } U1 \text{ in lower woven layer } U} = \frac{3}{1} \text{ at } \frac{\text{yarn count } O1}{\text{yarn count } U1} = \frac{1}{1}$$

Figure 4:
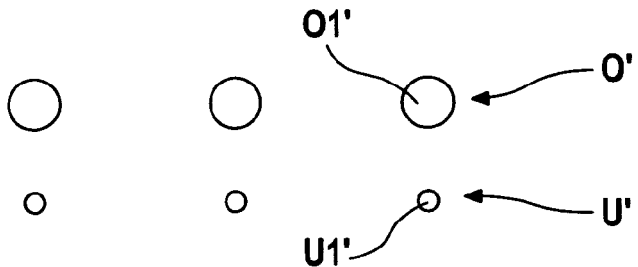
FIG. 4 is a section view through a further example embodiment of the invention.

Or
b) (e.g. FIG. 4)

$$\frac{\text{No. of first warp threads } O1' \ (O')}{\text{No. of first warp threads } U1' \ (U')} = \frac{1}{1} \text{ at}$$

$$\frac{\text{yarn count } O1' \ (O')}{\text{yarn count } U1' \ (U')} = \frac{3}{1}$$

Especially advantageous for example a) proved to be first warp threads O1 in the upper woven layer O with a yarn count of approx. 1670 dtex and first warp threads U1 in the lower woven layer U with a yarn count of likewise approx. 1670 dtex. Especially advantageous for example b) proved to be first warp threads O1' in the upper woven layer O' with a yarn count of approx. 1670 dtex and first warp threads U1' in the lower woven layer U' with a yarn count of approx. 550 dtex.

The invention claimed is:

1. An inflatable woven tubular belt comprising warp threads in an upper woven layer and warp threads in a lower woven layer, wherein the number of the warp threads in the upper woven layer is substantially 1.5 times to three times the number of the warp threads in the lower woven layer; further comprising outboard warp threads located in the upper woven layer and outboard warp threads located in the lower woven layer, the outboard warp threads of both of the layers being sandwiched between middle portions of each woven layer prior to inflation, the middle portions including the warp threads having the different upper-to-lower woven layer ratio.

2. An inflatable woven tubular belt comprising warp threads in an upper woven layer and warp threads in a lower woven layer, wherein a yarn count of the warp threads in the upper woven layer is 1.5 times to three times a yarn count of the warp threads in the lower woven layer; further comprising outboard warp threads located in the upper woven layer and outboard warp threads located in the lower woven layer, the outboard warp threads of both of the layers being sandwiched between middle portions of each woven layer prior to inflation, the middle portions including the warp threads having the different upper-to-lower woven layer ratio; and wherein the belt is a vehicular seat belt adapted to be pulled out of a retractor and rest flat on a passenger body without becoming corrugated.

3. The belt of claim 1, wherein the belt is a vehicular seat belt adapted to be pulled out of a retractor and rest flat on a passenger body without becoming corrugated.

4. The belt of claim 1, wherein the lower woven layer is closer to a winding spindle in a retractor than is the outer woven layer such that the lower woven layer is more stretched as compared to the outer woven layer when in this condition.

5. The belt of claim 1, wherein width-middle portions of the woven layers, containing the different ratio of warp threads, are overlapping each other but spaced from each other with a gap therebetween if inflated.

6. The belt of claim 2, wherein the lower woven layer is closer to a winding spindle in a retractor than is the outer woven layer such that the lower woven layer is more stretched as compared to the outer woven layer when in this condition.

7. The belt of claim 2, wherein width-middle portions of the woven layers, containing the different ratio of warp threads, are overlapping each other but spaced from each other with a gap therebetween if inflated.

\* \* \* \* \*